United States Patent [19]

Lotze et al.

[11] Patent Number: 4,889,769

[45] Date of Patent: Dec. 26, 1989

[54] METHOD OF PRODUCING MATTE PRECIOUS METAL DECORATIONS

[75] Inventors: Marion Lotze, Hammersbach; Peter Kleinschmit, Hanau, both of Fed. Rep. of Germany

[73] Assignee: Degussa Aktiengesellschaft, Frankfurt am Main, Fed. Rep. of Germany

[21] Appl. No.: 32,234

[22] Filed: Mar. 31, 1987

[30] Foreign Application Priority Data

Apr. 4, 1986 [DE] Fed. Rep. of Germany ....... 3611273

[51] Int. Cl.$^4$ ..................... B32B 15/00; B32B 17/06; B05D 3/02
[52] U.S. Cl. ..................... 428/432; 428/434; 427/226; 427/229; 427/380; 427/404; 427/419.2; 427/419.6; 501/18
[58] Field of Search ................. 501/18; 428/434, 432; 427/226, 380, 404, 419.2, 419.6, 229

[56] References Cited

U.S. PATENT DOCUMENTS

| | | | |
|---|---|---|---|
| 3,436,203 | 4/1969 | Wu | 427/419.2 |
| 4,004,935 | 1/1977 | Grosvenor et al. | 501/18 |
| 4,159,353 | 6/1979 | Adelsberg et al. | 427/419.2 |
| 4,311,504 | 1/1982 | Nigrin | 501/25 |
| 4,312,951 | 1/1982 | Eppler | 428/432 |
| 4,418,099 | 11/1983 | Cuevas et al. | 427/226 |
| 4,434,211 | 2/1984 | Shoher et al. | 427/419.2 |

FOREIGN PATENT DOCUMENTS 3122546 6/1981 Fed. Rep. of Germany .
2099760 12/1982 United Kingdom .

*Primary Examiner*—William R. Dixon, Jr.
*Assistant Examiner*—Anthony J. Green
*Attorney, Agent, or Firm*—Cushman, Darby & Cushman

[57] ABSTRACT

In order to produce matee precious metal decorations on carriers of ceramics and porcelain, before applying bright precious metal preparations, the carrier is first provided with a base layer composed of:

(a) 50 to 80% by weight of a mixture of
  (aa) 50 to 80% by weight of a lead-free borosilicate glazed frit with
  (bb) 20 to 70% by weight of titanium dioxide powder and
(b) 20 to 50% by weight of a mixture of
  (aa) 40 to 60% by weight of a modified alkyd resin having an oil content of 20 to 40% by weight and a solid content of 40 to 60% by weight and
  (bb) 40 to 60% by weight of an aromatic hydrocarbon.

8 Claims, No Drawings

METHOD OF PRODUCING MATTE PRECIOUS METAL DECORATIONS

BACKGROUND OF THE INVENTION

The invention is directed to a method for applying bright precious metal preparations on a ceramic or porcelain carrier to produce a matte precious metal decoration. The method comprises applying a base layer between the carrier and the precious metal layer. The base layer consists of or consists essentially of a mixture of a glazed frit, an oxide and an alkyd resin.

In order to produce matte precious metal decorations, preparations are used which consist of or consist essentially of finely powdered precious metals, precious metal compounds and flux components. These include the polished precious metal preparations with a precious metal content of 15 to 60% by weight which contain the components dispersed in a mixture of binder and solvent, and the powder preparations which contain precious metal contents of 90 to 100% by weight. Bright precious metal preparations in which the precious metal compounds are present in dissolved form, usually in the form of sulforesinates, have a precious metal content of 6 to 15% by weight and after burning at 600° to 900° C. have a very lustrous decoration.

German OS 31 22 546 discloses a method of producing a matte precious metal decoration on ceramic and procelain carriers by means of a bright precious metal preparation by applying a base layer between carrier and precious metal layer. This base layer consists of a mixture of a lead borosilicate glazed frit and of a mixture of tin dioxide, zinc oxide, aluminum oxide, iron oxide and chromium oxide, pasted on by an alkyd resin with an oil content of 60 to 70%. This method has the disadvantage that one must work with a physiologically hazardous glazed frit which contains lead.

SUMMARY OF THE INVENTION

The invention therefore is directed to the problem of developing a method for applying bright precious metal preparations to a ceramic or porcelain carrier to produce a matte precious metal decoration. The method comprises applying a base layer to the carrier before the precious metal layer is applied. The base layer consisting of or consists essentially of a mixture of a glazed frit, an oxide and of an alkyd resin. The glazed frit does not have to contain lead.

The invention solves this problem as follows: The base layer is composed of or consists essentially of:

(a) 50 to 80% by weight of a mixture of 30 to 80% by weight of a lead-free borosilicate glazed frit with 20 to 70% by weight of titanium dioxide powder and (b) 20 to 50% by weight of a mixture of 40 to 60% by weight of modified alkyd resin with an oil content of 20 to 40% by weight and with a solid content of 40 to 60% by weight with 40 to 60% by weight of an aromatic hydrocarbon solvent.

The bright precious metal preparations can be the bright gold, bright citron gold, bright palladium and bright platinum preparations customary in the trade. Alkyd resins modified with acrylics, urethane, vinyl toluene, styrene and epoxides are especially suitable as modified alkyd resins. Suitable modified alkyd resins are based for example on glycerol-phthalic anhydride-linseed oil and methyl methacrylate as modifier, or for example on glycerol-phthalic anhydride-dehydrated castor oil and low molecular epoxy resin of the Bisphenol-A type as modifier, or for example on trimethylol propane-phthalic anhydride-coconut oil and isocyanurat/isocyanate systems as modifier.

It is preferable to use borosilicate glazed frits which contain 45 to 65% silicon dioxide, 10 to 25% boron oxide ($B_2O_3$), 5 to 15% aluminum oxide, 5 to 10% alkali oxide (e.g. sodium oxide or potassium oxide) 5 to 10% calcium oxide, 0 to 5% magnesium oxide and 0 to 2% zinc oxide.

The particle size of the glazed frit and of the titanium dioxide is advantageously between 3 and 5μ) on the average.

Xylene and trimethylbenzenes have proven to be good aromatic hydrocarbons. There can also be used other solvents known in the field of ceramic dyes.

The use of the method of the invention results in matte decorations on ceramics and porcelain even with bright precious metal preparations without having to use glazed frits containing lead.

The composition can consist of or consist essentially of the stated materials.

DETAILED DESCRIPTION

The following examples are intended to explain the method of the invention in more detail:

EXAMPLE 1

A base layer was pressed on a porcelain fragment which layer consisted of 45% by weight of a glazed frit, 30% by weight titanium dioxide, 8% by weight alkyd resin (acrylic modified, oil content 40% by weight) and 17% by weight of an aromatic hydrocarbon (Shellsol AB). The glazed frit consisted of 46% by weight $SiO_2$, 23% by weight $B_2O_3$, 13% by weight $Al_2O_3$, 1% by weight ZnO, 7% by weight CaO, 4% by weight MgO and 6% by weight $Na_2O$. After drying, a bright gold preparation available in the trade was pressed on. A matte gold decor was obtained after burning.

EXAMPLE 2

A base layer is used in analogy to Example 1 which base layer consists of 40% by weight glazed frit, 35% by weight titanium dioxide, 6% by weight alkyd resin (modified with epoxide, oil content 30%) and 19% by weight of a Xylene mixture. The glazed frit contains 63% by weight $SiO_2$, 13% by weight $B_2O_3$, 8% by weight $Al_2O_3$, 1% by weight ZnO, 8% by weight CaO and 7% by weight $Na_2O$. A matte gold decor is also obtained here.

The decorations can also be transferred by means of a ceramic transfer picture.

The entire disclosure of German OS P3611273.59 is hereby incorporated by reference.

We claim:

1. In a method for applying a bright precious metal preparation to a ceramic or porcelain carrier to produce a matte precious metal decoration which comprises applying a base layer to the ceramic or porcelain carrier, applying a layer comprising precious metal to the base layer, applying a glazing to the precious metal layer and firing the ceramic or porcelain carrier, the improvement wherein said base layer consists essentially of:

(a) 50 to 80% by weight of a mixture of
(aa) 30 to 80% by weight of lead-free borosilicate glazed frit with (bb) 20 to 70% by weight of titanium dioxide powder and (b) 20 to 50% by weight of a mixture of
 (aa) 40 to 60% by weight of a modified alkyd resin with an oil content of 20 to 40% by weight and a solid content of 40 to 60% by weight with
 (bb) 40 to 60% by weight of an aromatic hydrocarbon.

2. The method according to claim 1, wherein the glazed frit consists essentially of 45 to 65% by weight silicon dioxide, 10 to 25% by weight boron oxide ($B_2O_3$), 5 to 15% by weight aluminum oxide, 5 to 10% by weight calcium oxide, 0 to 5% by weight magnesium oxide and 0 to 2% by weight zinc oxide.

3. The method according to claim 2, wherein the alkyd resin is modified with an acrylic, urethane, vinyl toluene, styrene or epoxide.

4. The method according to claim 1, wherein the alkyd resin is modified with an acrylic, urethane, vinyl toluene, styrene or epoxide.

5. A ceramic or porcelain article decorated with a matte precious metal preparation, said decorated ceramic or porcelain article comprising a base layer between the ceramic or porcelain and the precious metal preparation, said base layer consisting essentially of:

(a) 50 to 80% by weight of a mixture of
 (aa) 30 to 80% by weight of a lead-free borosilicate glazed frit with
 (bb) 20 to 70% by weight of titanium dioxide powder and (b) 20 to 50% by weight of a mixture of
 (aa) 40 to 60% by weight of a modified alkyd resin with an oil content of 20 to 40% by weight and a solid content of 40 to 60% by weight with
 (bb) 40 to 60% by weight of an aromatic hydrocarbon.

6. The ceramic or porcelain article according to claim 5, wherein the glazed frit consists essentially of 45 to 65% by weight silicon dioxide, 10 to 25% by weight boron oxide ($B_2O_3$), 5 to 15% by weight aluminum oxide, 5 to 10% by weight calcium oxide, 0 to 5% by weight magnesium oxide and 0 to 2% by weight zinc oxide.

7. The ceramic or porcelain article according to claim 6, wherein the alkyd resin is modified with an acrylic, urethane, vinyl toluene, styrene or epoxide.

8. The ceramic or porcelain article according to claim 5, wherein the alkyd resin is modified with an acrylic, urethane, vinyl toluene, styrene or epoxide.

* * * * *